United States Patent
Lin et al.

(10) Patent No.: US 11,099,158 B2
(45) Date of Patent: Aug. 24, 2021

(54) THREE DIMENSIONAL DETECTION DEVICE, SURFACE DETECTION METHOD AND PRODUCTION LINE APPARATUS USING THE SAME

(71) Applicants: GAUSS DESIGN INC, New Taipei (TW); Chih-Chieh Lin, New Taipei (TW); Hsien-Kuo Wang, New Taipei (TW)

(72) Inventors: Chih-Chieh Lin, New Taipei (TW); Hsien-Kuo Wang, New Taipei (TW)

(73) Assignee: GAUSS DESIGN INC, New Taipei (TW)

( * ) Notice: Subject to any disclaimer, the term of this patent is extended or adjusted under 35 U.S.C. 154(b) by 0 days.

(21) Appl. No.: 16/800,620

(22) Filed: Feb. 25, 2020

(65) Prior Publication Data

US 2020/0191954 A1 Jun. 18, 2020

Related U.S. Application Data

(63) Continuation-in-part of application No. 15/977,468, filed on May 11, 2018, now abandoned.

(51) Int. Cl.
*G01N 29/04* (2006.01)
*G01S 15/89* (2006.01)
(Continued)

(52) U.S. Cl.
CPC .......... *G01N 29/046* (2013.01); *G01N 29/04* (2013.01); *G01N 29/07* (2013.01); *G01S 15/89* (2013.01);
(Continued)

(58) Field of Classification Search
CPC .. G01N 29/046; G01N 29/4427; G01N 29/07; G01N 29/04; G01N 2291/0289;
(Continued)

(56) References Cited

U.S. PATENT DOCUMENTS

| 5,737,084 A | * | 4/1998 | Ishihara | ............... | G01B 11/026 |
| | | | | | 356/609 |
| 6,878,115 B2 | * | 4/2005 | Dione | .................. | A61B 8/0825 |
| | | | | | 600/459 |

(Continued)

FOREIGN PATENT DOCUMENTS

| CN | 107133950 A | * | 9/2017 | ............... | G06T 7/00 |
| CN | 107860338 A | * | 3/2018 | ............. | G01B 11/25 |

(Continued)

*Primary Examiner* — Jacques M Saint Surin
(74) *Attorney, Agent, or Firm* — Demian K. Jackson; Jackson IPG PLLC

(57) ABSTRACT

A three dimensional (3D) detection device has a detection supporter base to be disposed on a transmission device, ultrasonic transceiver modules disposed on at least one inner base surface of the detection supporter base and a controller. When a tested object is transmitted by the transmission device and then enters the detection supporter base, the ultrasonic transceiver modules emit ultrasonic signals to the tested object, and the tested object reflects the ultrasonic signals to the ultrasonic transceiver modules. The ultrasonic transceiver modules generate detection signals according to the reflected ultrasonic signals. The detection signals are sent to the controller, and the controller generates an ultrasonic image corresponding to a tested object according to the detection signals, and then compares the ultrasonic image to a pre-established original 3D image, so to achieve a surface detection objective.

12 Claims, 9 Drawing Sheets

(51) Int. Cl.
*G06T 7/00* (2017.01)
*G01N 29/07* (2006.01)

(52) U.S. Cl.
CPC ...... *G06T 7/001* (2013.01); *G01N 2291/0289* (2013.01); *G06T 2207/10136* (2013.01)

(58) Field of Classification Search
CPC ... G01N 2291/045; G01S 7/521; G01S 15/88; G01S 15/87; G06T 7/001; G06T 2207/30164
USPC .......................................................... 73/628
See application file for complete search history.

(56) References Cited

U.S. PATENT DOCUMENTS

| | | | | |
|---|---|---|---|---|
| 8,784,203 | B2 * | 7/2014 | Zalewski | G06F 3/0346 463/31 |
| 9,869,753 | B2 * | 1/2018 | Eldada | G01S 17/10 |

FOREIGN PATENT DOCUMENTS

| | | | | |
|---|---|---|---|---|
| CN | 207816214 U | * | 9/2018 | G01B 11/25 |
| CN | 211926793 U | * | 11/2020 | G01B 11/24 |

* cited by examiner

THREE DIMENSIONAL DETECTION DEVICE, SURFACE DETECTION METHOD AND PRODUCTION LINE APPARATUS USING THE SAME

CROSS REFERENCE

This non-provisional application is a continuation-in-part of application which claims priority to the pending non-provisional application for patent Ser. No. 15/977,468, filed May 11, 2018.

BACKGROUND

1. Technical Field

The present disclosure relates to a detection technology which utilizes ultrasonic to establish a three dimensional image, wherein the three dimensional image is directly compared with a dimension and a size of an accepted object, so as to reduce a detection time, and the present disclosure is suitable for the requirement of the application of the automatically continuous processing process.

2. Related Art

In the current processing and manufacturing field, the surface quality detection of the product is very important. In addition to check the processing completeness of the product to maintain the processing quality of the product, the surface detection can further find whether the related processing device operates abnormally or runs down according to the produced defect on the product surface.

The conventional surface detection method for the product is usually performed by a visual inspection manner. Generally, after the quality checker visually checks the surface statuses of the upper surface and the lower surface associated with the produce, she or he must make a related detection judgment in time, and the detection results may differ from person to person, thus not being able to reflect the whole quality statuses of the products in time due to the occasional detection loss.

As the technology advances, the digital image recognition ability is enhanced. The related automatic surface detection system is provided accordingly, and the well-known scanning manner by using the optical instrument (such as, infrared ray scanner) is used to check the defect on the product surface. Since the optical scanning forms the line from the points, and forms the surface from the lines, it must cost long time, and the time interval for randomly sampling is relatively increased. Therefore, such prior art is not suitable for the current requirement of the application of the automatically continuous processing process.

SUMMARY

Accordingly, the present disclosure is used to provide a three dimensional (3D) detection device, a surface detection method and a production line apparatus using the same, wherein a 3D image of a tested object is established and compared with that of an accepted object, and the present disclosure is suitable for the requirement of the application of the automatically continuous processing process.

One objective of the present disclosure is to provide a 3D detection device which at least comprises: a detection supporter base, disposed on a transmission device of a production line apparatus; ultrasonic transceiver modules, disposed on at least one inner base surface of the detection supporter base, for emitting ultrasonic signals to surfaces of a tested object which enters the detection supporter base, receiving the reflected ultrasonic signals from the surfaces of the tested object, and generating detection signals according to the reflected ultrasonic signals; and a controller, communicatively connected to the ultrasonic transceiver modules, for receiving the detection signals, generating a 3D ultrasonic image according to the detection signals, and comparing the 3D ultrasonic image with a pre-established 3D image, so as to determine whether the surfaces of the tested object have at least one size or appearance defect.

According to the above, the 3D detection device utilizes the ultrasonic measuring and is configured to have detection supporter base. It does not need a bright environment, the reflected ultrasonic signals are easily received by the ultrasonic transceiver module, and the 3D image of the tested object can be established and compared with the original 3D deign image of the accepted object, which achieves 3D detection of multiple surfaces and/or multiple views.

According to the above features, the detection supporter base is disposed with the ultrasonic transceiver module therein, so as to achieve the objective of detecting multiple surfaces of the tested object at the same time.

According to the above features, the ultrasonic transceiver module comprises an ultrasonic transmitting unit and an ultrasonic receiving unit.

According to the above features, the ultrasonic transceiver module comprises one or more ultrasonic transmitting units and one or more ultrasonic receiving units.

The ultrasonic transmitting unit and the ultrasonic receiving unit can be integrated in a single one module. Since an area of the inner base surface of the detection supporter base is limited, and the detection accuracy is related to the number of the ultrasonic transceiver modules, it is easy to achieve the objective of high detection accuracy when adopting the technical means of integrating the ultrasonic transmitting unit and the ultrasonic receiving unit in a single one module.

According to the above features, the 3D ultrasonic image and the 3D image are a modeling processed 3D ultrasonic image and a modeling processed 3D image, and the modeling processed 3D ultrasonic image and the modeling processed 3D image are compared with each other to generate a difference image.

The modeling processed 3D ultrasonic image and the modeling processed 3D image can be output to the display via the output interface unit, such that the difference of the comparison can be displayed on the display, and the detection user can view the difference intuitively.

According to the above features, the 3D ultrasonic image and the 3D image are compared with each other in at least one of a time domain, a frequency domain or a spatial domain.

According to the above features, to compare the 3D ultrasonic image with the 3D image, at least one eigenvalue or characteristic vector in one of a time domain, a frequency domain or a spatial domain of the 3D ultrasonic image is compared with that of the 3D image According to the above features, to compare the 3D ultrasonic image with the 3D image, a trained convolution neuron network is used to determine whether the surfaces of the tested object corresponding to the 3D ultrasonic image have the at least one size or appearance defect.

To consider tradeoff between the detection accuracy and calculation complexity, one of the above comparison manners can selected to meet the actual requirement.

One objective of the present disclosure is to provide a surface detection method which comprises steps of: providing the above 3D detection device; performing an ultrasonic measuring process on the tested object in the detection supporter base, so as to obtain the 3D ultrasonic image; obtaining the 3D image of an accepted object; comparing the 3D ultrasonic image with the 3D image; and outputting a detection result.

One objective of the present disclosure is to provide a production line apparatus, comprising: the above 3D detection device; and the transmission device, having a transmission belt and a motor, wherein the motor drives the transmission belt to transmit the tested object on the transmission belt.

According to the above features, the production line apparatus further comprises: grabbing devices, wherein one of them is used to grab the tested object in a pickup region to the transmission belt, and another one of them is used to grab the tested object which has passed the detection supporter base to an accepted object region or a defective object region according to a detection result.

In short, the 3D detection device and the surface detection method of the present disclosure utilize the ultrasonic measuring, and the 3D detection device has detection supporter base. Without a light source, the ultrasonic can scan the tested object to establish the 3D image of the tested object, and the 3D image of the tested object is compared with the original established 3D image of the accepted object. Therefore, the size and/or appearance defect of the tested object can be quickly detected.

DESCRIPTION OF THE EXEMPLARY EMBODIMENTS

The present disclosure provides a 3D detection device used in a production line apparatus, wherein the 3D detection device is disposed on a transmission device of the production line apparatus, and comprises a detection supporter base, ultrasonic transceiver modules and a controller. The ultrasonic transceiver modules are disposed on an inner base surface of the detection supporter base, used to emit ultrasonic signals to surfaces of a tested object which enters the detection supporter base, and used to receive the reflected ultrasonic signals from the surfaces of the tested object to generate detection signals accordingly. The controller is communicatively connected to the ultrasonic transceiver modules via wireless or wired manner, used to acquire the detection signals, and used to generate a 3D ultrasonic image of the tested object according to the detection signals. Next, the controller acquires a pre-established 3D image of an accepted object, compares the 3D ultrasonic image of the tested object and the 3D image of an accepted object, and outputs a detection result or a comparison result accordingly, so as to finish the surface detection. The 3D detection device provided by the present disclosure utilizes the ultrasonic measuring and is configured to have a detection supporter base. Without the light source, the reflected ultrasonic signals are easily received by the ultrasonic transceiver module, the quality of the detection signals is better, and thus it results a precise detection result, and decreases a detection time much. Further, the present disclosure is suitable for the requirement of the application of the automatically continuous processing process, and it provides a reliable and positive means for preventing the defective objects from being continuously generated, and for monitoring an availability of the production line apparatus.

Figure 1:
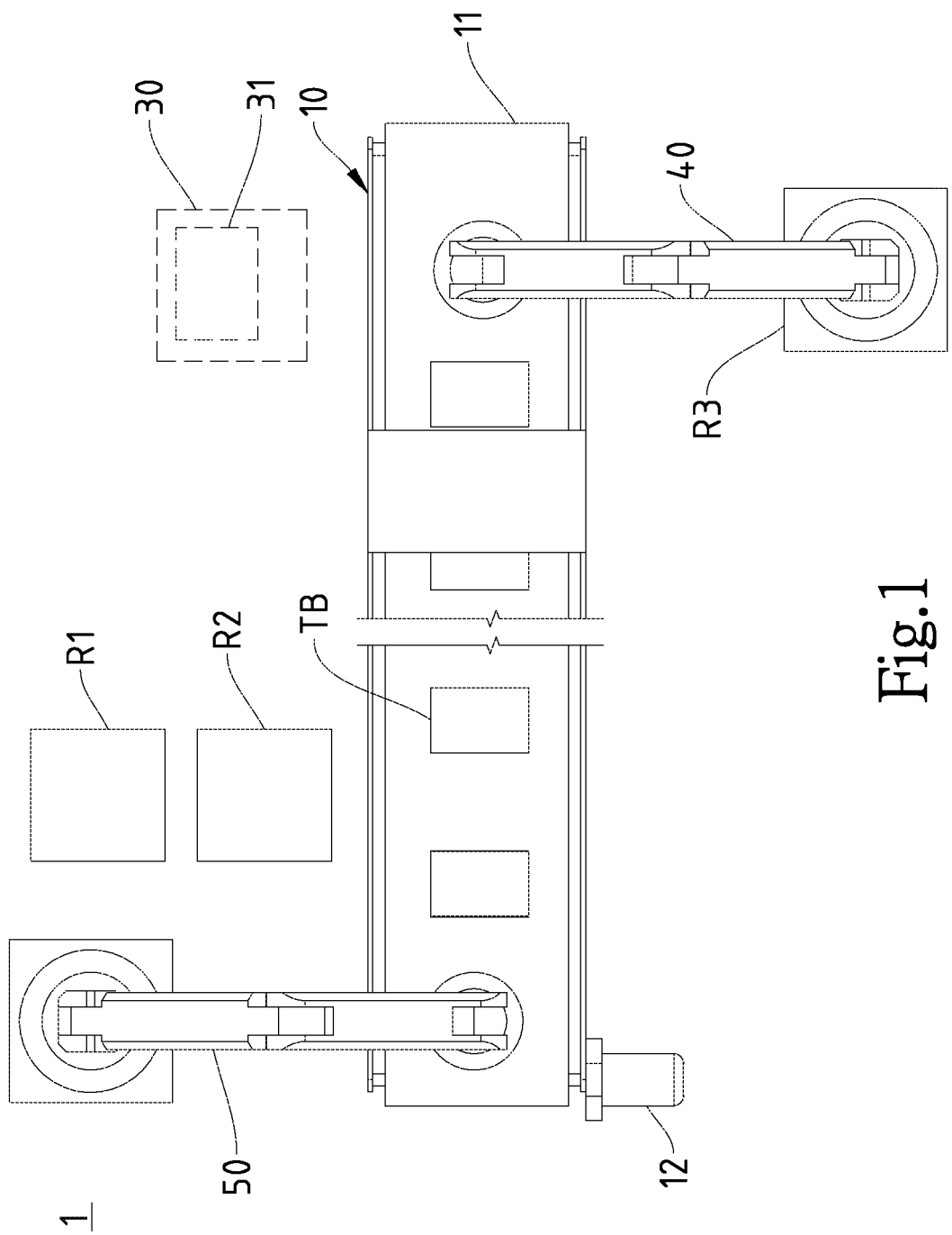
FIG. 1 a top view of a production line apparatus according to an embodiment of the present disclosure.
Figure 2:
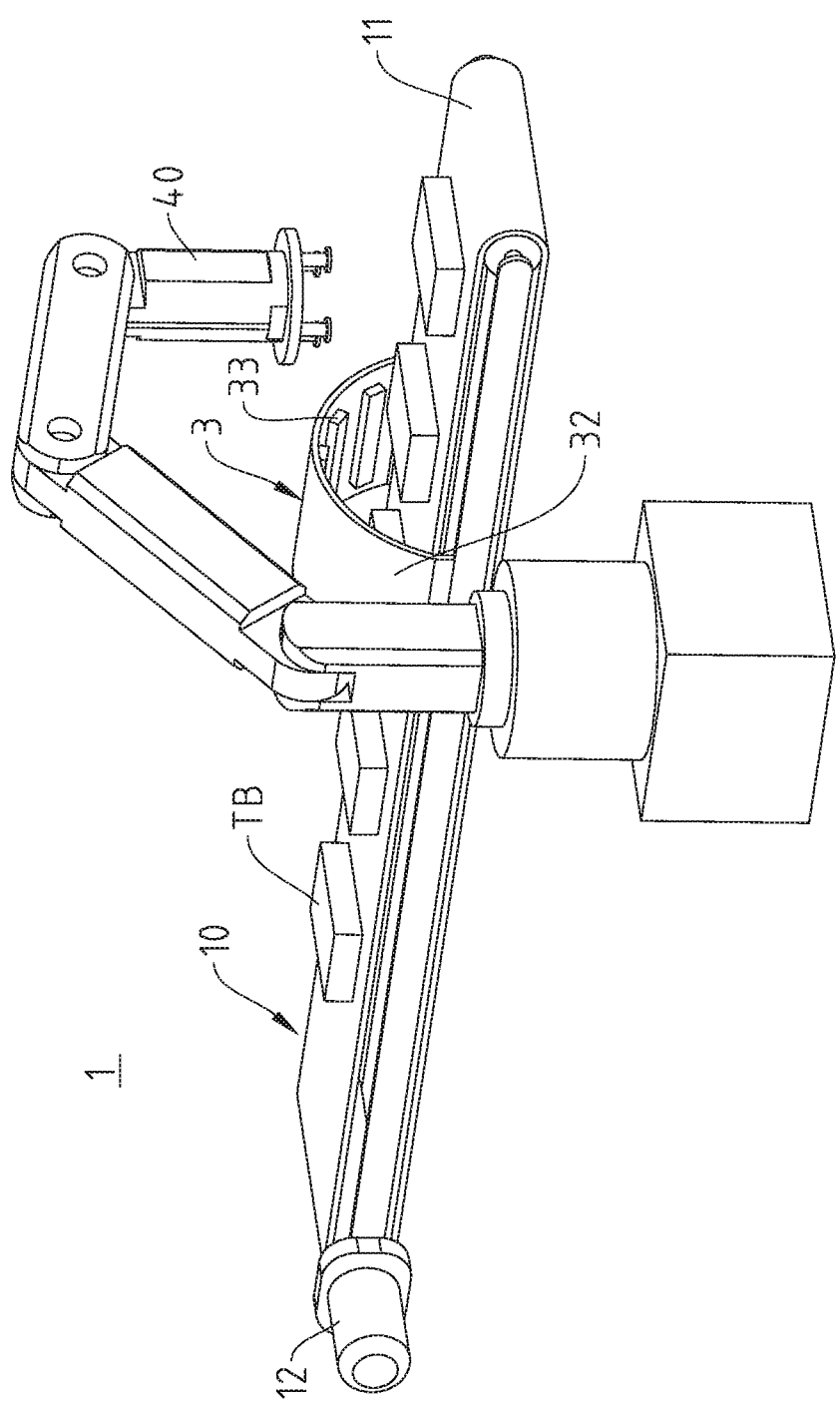
FIG. 2 is a 3D view of a partial of a production line apparatus according to an embodiment of the present disclosure.

Firstly, refer to FIG. 1 and FIG. 2. FIG. 1 a top view of a production line apparatus according to an embodiment of the present disclosure, and FIG. 2 is a 3D view of a partial of a production line apparatus according to an embodiment of the present disclosure. The production line apparatus 1 comprises a transmission device 10, a pickup region R3, an accepted object output region R1, a defective object output region R2, a first grabbling device 40, a second grabbling device 50 and a 3D detection device 3. The transmission device 10 comprises a transmission belt 11 and a motor 12. The motor 12 is connected to the transmission belt 11, and used to drive the transmission belt 11 to transmit the tested object TB on the transmission belt 11, such that the tested object TB moves forward a specific direction. For example, in the embodiment, the tested object TB move left. The pickup region R3 comprises tested objects TB (the tested object TB can be the product or the semi-product, and the present disclosure is not limited thereto), and the first grabbling device 40 is used to grab one tested object TB to and on one end (such as, right end) of the transmission belt 11 of the transmission device 10. Generally, the pickup region R3 can be one part of another transmission device of another transmission path.

The 3D detection device 3 can be disposed between two ends (such as, the left and right ends) of the transmission belt 11 of the transmission device 10, and the 3D detection device 3 comprises a controller 30, a detection supporter base 32 and multiple ultrasonic transceiver modules 33, wherein the ultrasonic transceiver module 33 are disposed on the inner base surface of the detection supporter base 32, and the controller 30 and the ultrasonic transceiver modules 33 are communicatively connected to each other. The detection supporter base 32 is disposed on and fixed to the transmission belt 11 of the transmission device 10 via a screwing manner, a clamping manner or another one fixing manner. The detection supporter base 32 can be the curved, semi-circular, T-shaped or polygonal base, and the present disclosure is not limited thereto. Preferably, the detection supporter base 32 can be the curved, semi-circular or T-shaped base, such that it is easy to achieve the objective of detecting multiple surface of the tested object TB.

After the first grabbling device 40 grabs the tested object TB on the transmission belt 11, and the tested object TB enters the detection supporter base 32, the ultrasonic transceiver modules 33 emit ultrasonic signals to surfaces of the tested object TB in the detection supporter base, and receive the reflected ultrasonic signals from the surfaces of the tested object TB to generate detection signals. Next, the controller 30 acquires detection signals, and generates a 3D ultrasonic image of the tested object TB according to the detection signals. Next, the controller 30 acquires a pre-established 3D image of an accepted object, and compares the tested 3D ultrasonic image of the tested object TB and the 3D image of the accepted object to generate a comparison result, so as to finish the surface detection. The second grabbling device 50 grabs the tested object TB which passes the detection supporter base 32 to the accepted object output region R1 or the defective object output region R2. Generally, the accepted object output region R1 and the defective object output region R2 can be parts of another two transmission devices on another two transmission paths.

To compare the 3D ultrasonic image and the 3D image to determine whether the tested object TB has at least one defect can be to directly compare the 3D ultrasonic image with the 3D image, and thus the difference can be used to determine whether the tested object TB has at least one defect. Another one manner is to transform the 3D ultrasonic image and the 3D image from a spatial domain to a frequency domain and a time domain (such as, via DWT or FFT), and to compare the transformed 3D ultrasonic image with the transformed 3D image to generate the difference which is used to determine whether the tested object TB has at least one defect. Another one manner is to obtain at least one eigenvalue or characteristic vector in the frequency, time or spatial domain of the 3D ultrasonic image and at least one eigenvalue or characteristic vector in the frequency, time or spatial domain of the 3D image, and then to compare the eigenvalue or characteristic vector of the 3D ultrasonic image with that of the 3D image, such that whether the tested object TB has the defect is determined. Another one manner is to utilize a convolutional neuron network, wherein multiple 3D images of accepted object are input to train the convolutional neuron network, the trained convolutional neuron network has the characteristic vectors, and the trained convolutional neuron network receives the 3D ultrasonic image of the tested object TB to determine whether the test object TB is the accepted object.

By the way, to further enhance the detection accuracy, the detection supporter base 32 can be disposed with cameras on its inner base surface, so as to photograph the surfaces of the tested object TB, and to acquire an optical image of the tested object TB. The controller 30 then compares the optical image of the tested object TB with a pre-established optical image of the accepted object, so as to whether the test object TB has the defect. In short, by utilizing the ultrasonic and optical measuring to detect the surfaces of the tested object TB, the detection result is more accurate. For example, when an detection result determines the tested object TB is the defective object, and another one detection result determines the tested object TB is the accepted object, the motor 12 controls the transmission belt 11 stop transmission, and the ultrasonic and optical measuring is performed on the tested object TB in the detection supporter base 32 again. Only when two detection results are identical to each other, the tested object TB is allowed to pass the detection supporter base 32.

Figure 3A:
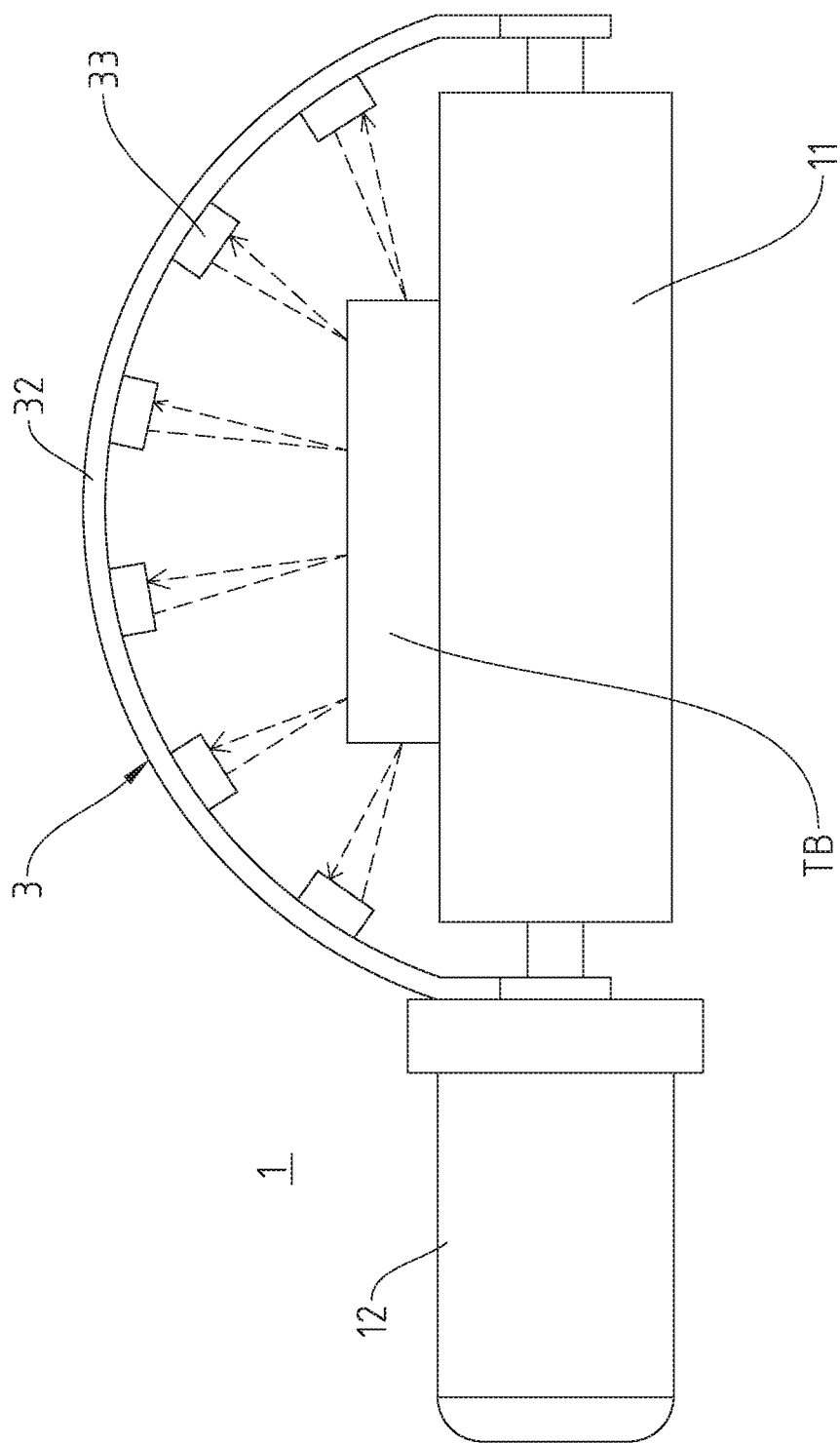
FIG. 3A is a side view of a production line apparatus according to an embodiment of the present disclosure.
Figure 3B:
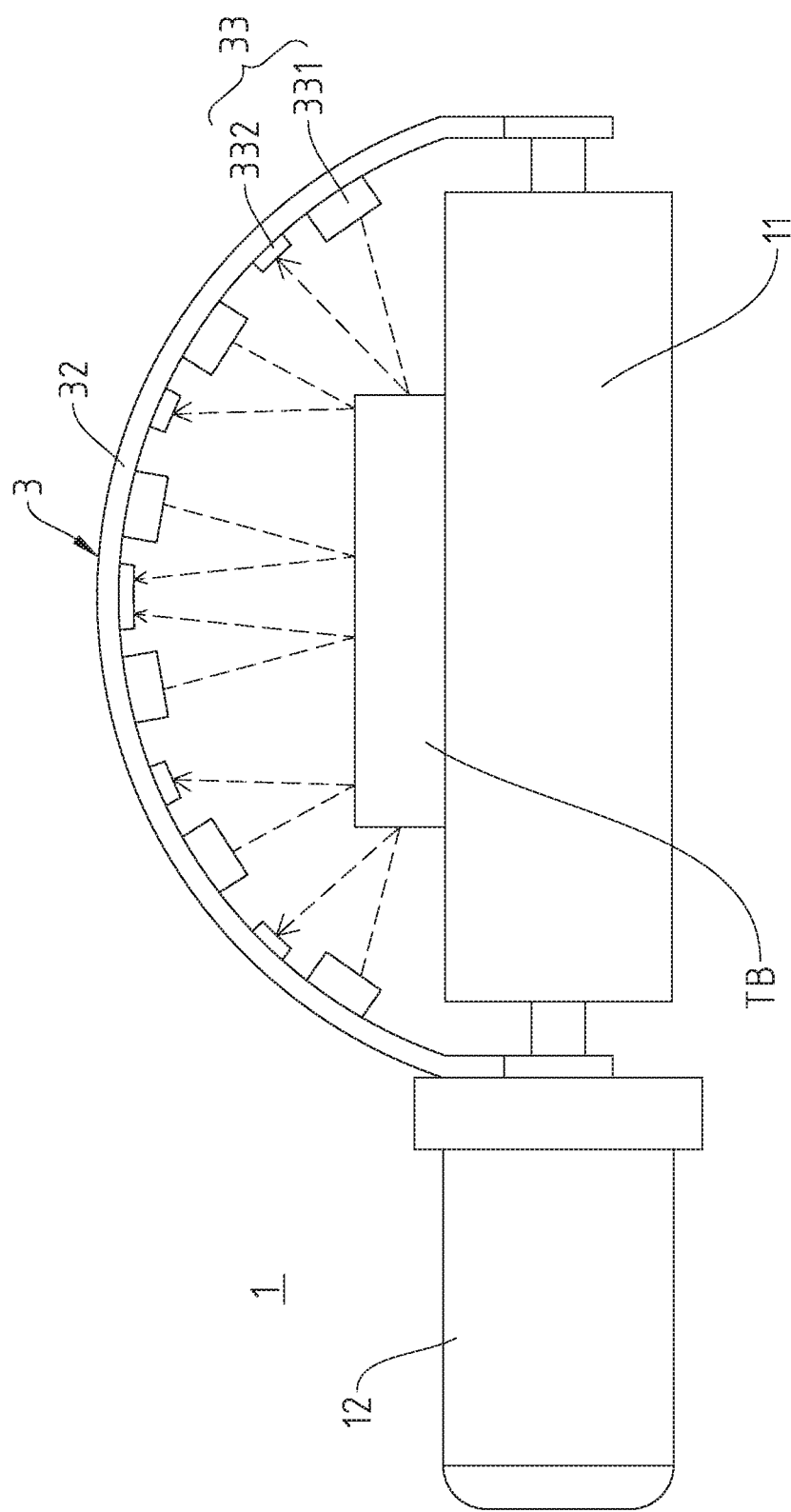
FIG. 3B is a side view of a production line apparatus according to another one embodiment of the present disclosure.

Next, refer to FIG. 3A and FIG. 3B. FIG. 3A is a side view of a production line apparatus according to an embodiment of the present disclosure, and FIG. 3B is a side view of a production line apparatus according to another one embodiment of the present disclosure. FIG. 3A and FIG. 3B illustrate two implementations of the ultrasonic transceiver modules 33. In FIG. 3A, the ultrasonic transceiver module 33 comprises an ultrasonic transmitting unit and an ultrasonic receiving unit, both of which are integrated in single one module; and in FIG. 3B, the ultrasonic transceiver module 33 comprises the ultrasonic transmitting unit 331 and the ultrasonic receiving unit 332, both of which are separated from each other but not integrated in the single one module. By the way, to enhance the detection accuracy, more number of the ultrasonic transceiver modules 33 is needed. Since the area of the inner base surface of the detection supporter base 32 is limited, the embodiment of FIG. 3A is preferred.

Figure 4:
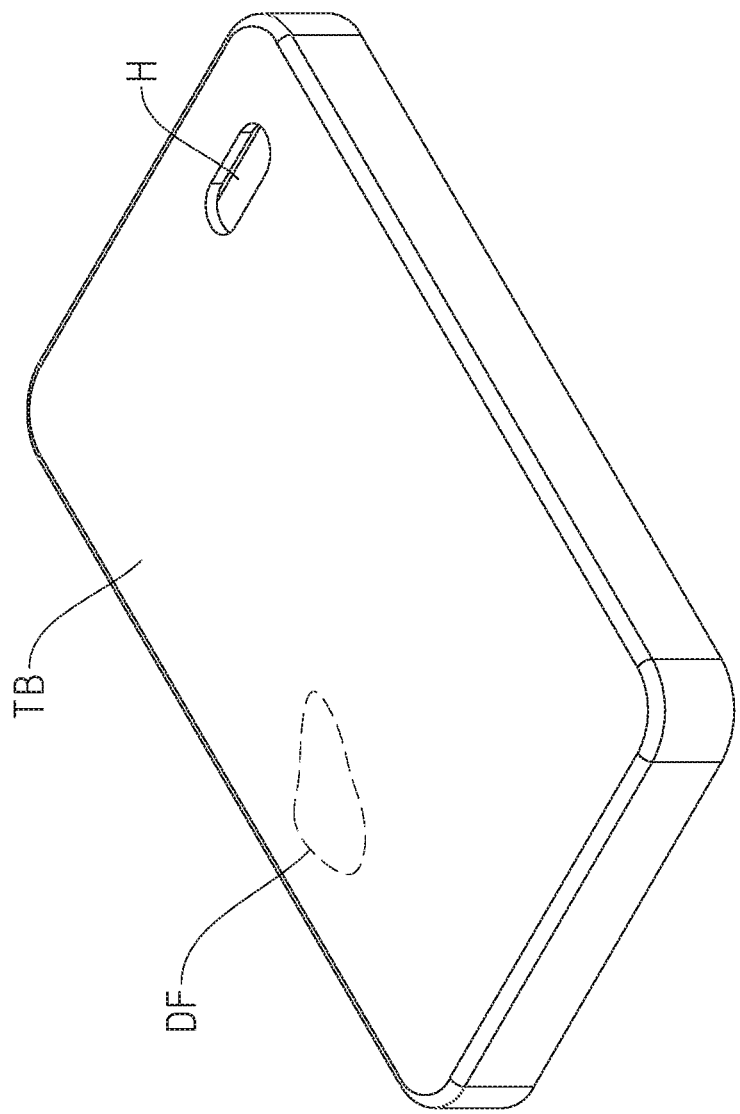
FIG. 4 is a 3D view of a tested object according to an embodiment of the present disclosure.
Figure 5:
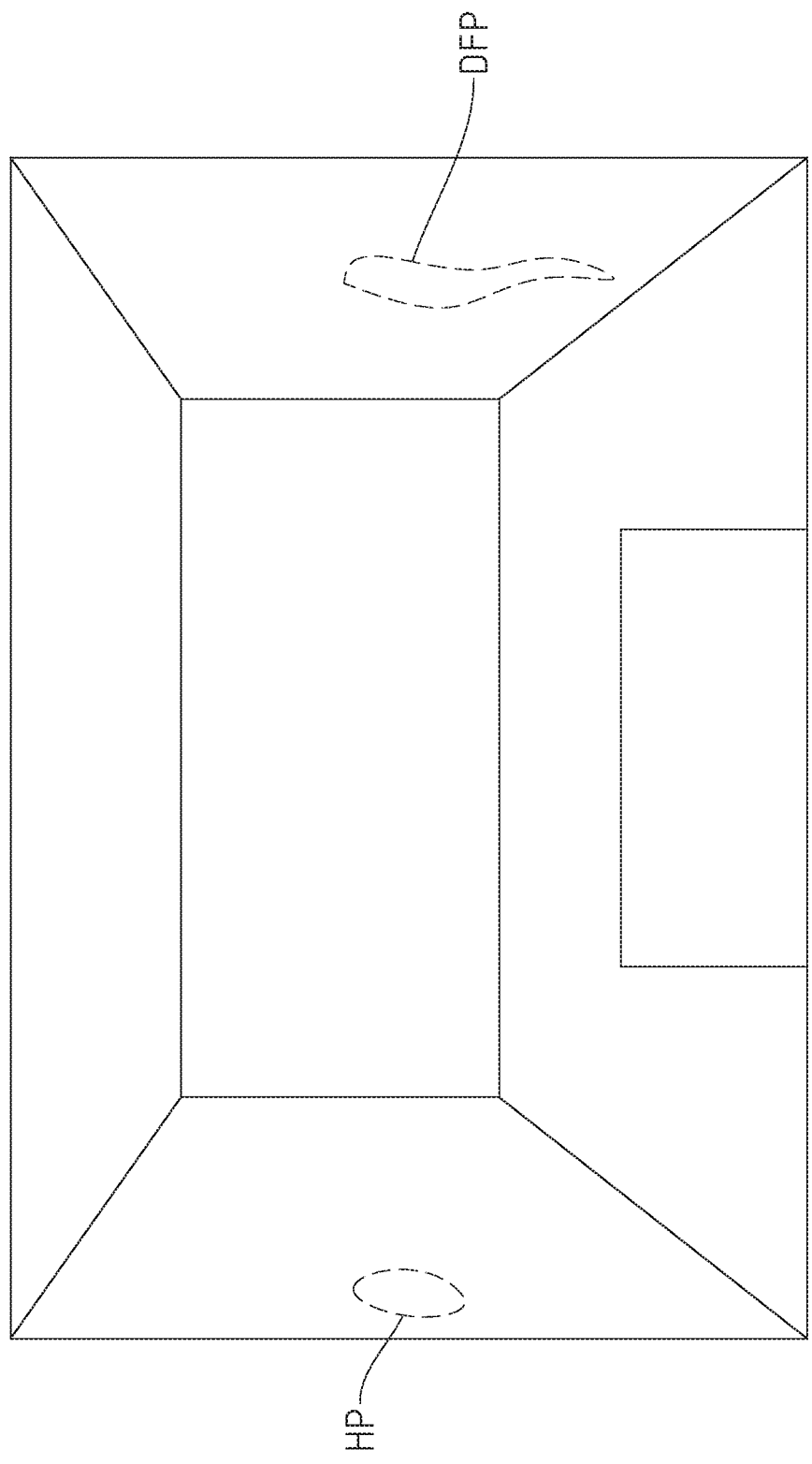
FIG. 5 is a schematic diagram of a 3D ultrasonic image of a tested object according to an embodiment of the present disclosure.

Next, refer to FIG. 2, FIG. 4, and FIG. 5. FIG. 4 is a 3D view of a tested object according to an embodiment of the present disclosure. FIG. 5 is a schematic diagram of a 3D ultrasonic image of a tested object according to an embodiment of the present disclosure. The tested object TB can be a phone case, and the phone case has a camera hole H. In FIG. 4, the phone case has a surface defect DF, wherein the surface defect DF can be a surface depression, a surface protrusion, a size deviation or a product deformation. Since the ultrasonic transceiver modules 33 detects parts of difference surfaces of the phone case, the detection signals are directly converted to the 3D ultrasonic image UIMG without being performed with a modeling process, as shown in FIG. 5, wherein the 3D ultrasonic image UIMG shows a camera hole pattern HP and a surface defect pattern DFP. The 3D image of the accepted phone case does not has the surface defect pattern DFP, and therefore, by comparing the 3D ultrasonic image UIMG of the tested phone case and the 3D image of the accepted phone case, whether the tested phone case has the defect can be determined.

Figure 6:
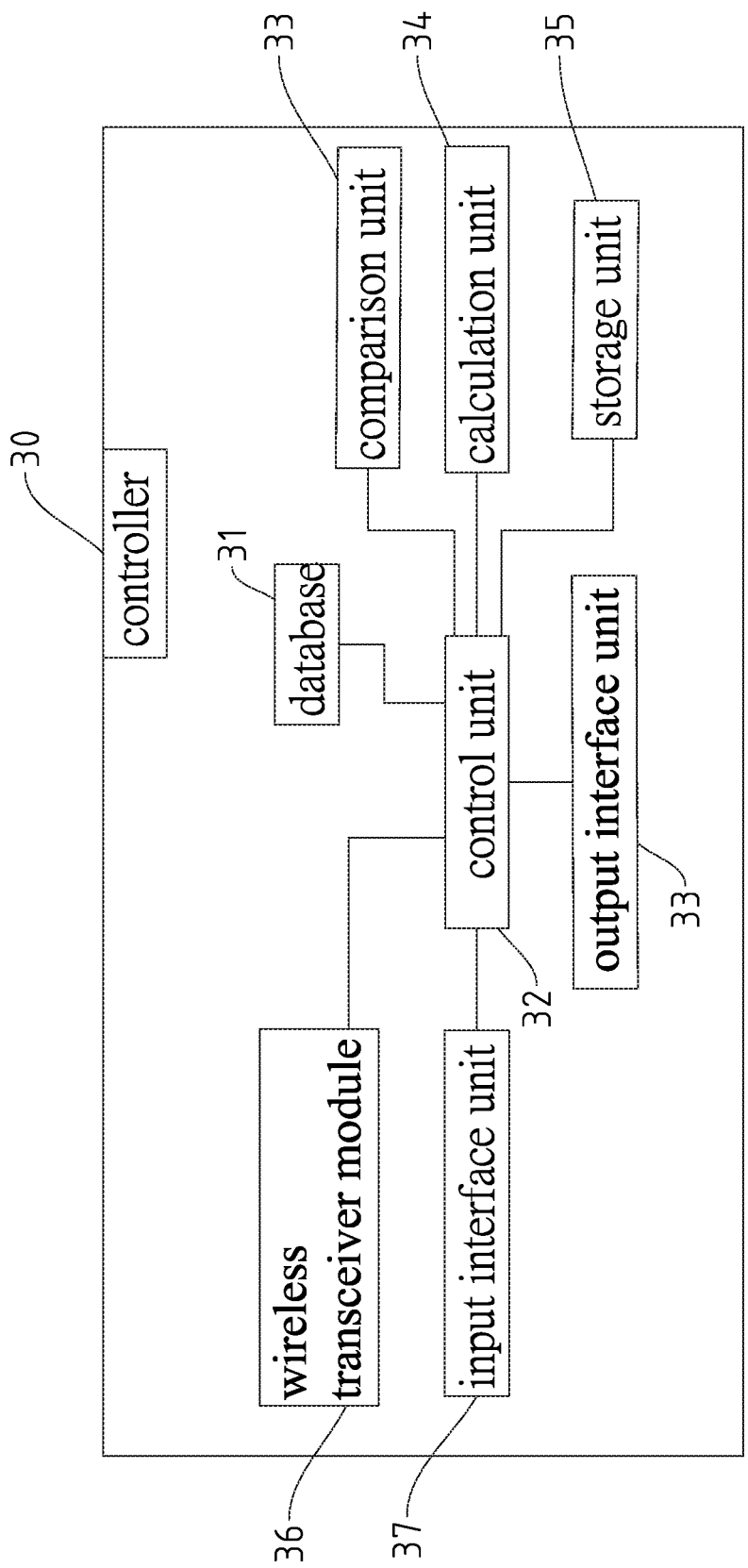
FIG. 6 is a block diagram of a controller according to an embodiment of the present disclosure.

Next, refer to FIG. 6. FIG. 6 is a block diagram of a controller according to an embodiment of the present disclosure. In the embodiment, the controller 30 is implemented as shown by FIG. 6, but the controller 30 of the present disclosure is not limited thereto. In another one embodiment, the controller 30 may be implemented by a microcontroller accompanying with software. In the embodiment, the controller 30 comprises a database 31, a control unit 32, a comparison unit 33, a calculation unit 34, a storage unit 35, a wireless transceiver module 36, an input interface module 37 and a output interface unit 38. The control unit 32 is electrically connected to the database 31, the comparison unit 33, the calculation unit 34, the storage unit 35, the wireless transceiver module 36, the input interface module 37 and the output interface unit 38, and used to control operations of them. The database 31 is used to store the 3D image, and the comparison unit 33 is used to compare the 3D ultrasonic image with the 3D image. The calculation unit 34 is used to calculate the detection signals to generate the 3D ultrasonic image, and preferably, a modeling process is performed on the 3D ultrasonic image, such that the shape of the 3D ultrasonic image is similar to the actual shape of the tested object. The storage unit 35 can store each detection result of the surface detection and the statistic data. The wireless transceiver module 36 is used to make the controller 30 communicatively connected to other electronic devices via the wireless or wired manner. The input interface module 37 can acquire input data via the wireless or wired manner, and the output interface unit 38 can output data to other electronic devices via the wireless or wired manner.

Figure 7:
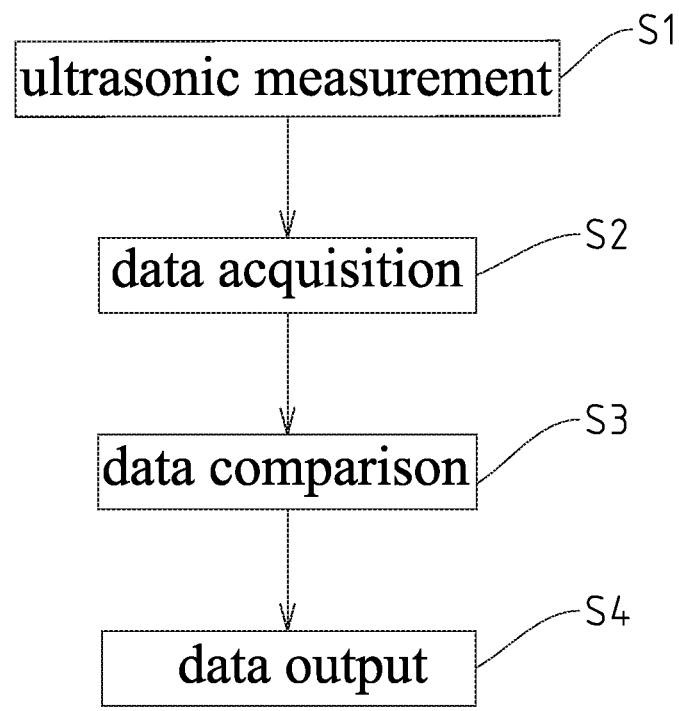
FIG. 7 is a flow chart of a surface detection method according to an embodiment of the present disclosure.

Next, refer to FIG. 7. FIG. 7 is a flow chart of a surface detection method according to an embodiment of the present disclosure. The surface detection has steps as follows. At step S1, the above 3D detection device is provided, and the ultrasonic measuring is performed on the tested object which enters the detection supporter base, so as to obtain the 3D ultrasonic image. At step S2, the pre-established 3D image of the accepted object is acquired. At step S3, the 3D ultrasonic image is compared with the 3D image, so as determine whether the tested object has the defect. At step S4, the detection result is output.

Figure 8:
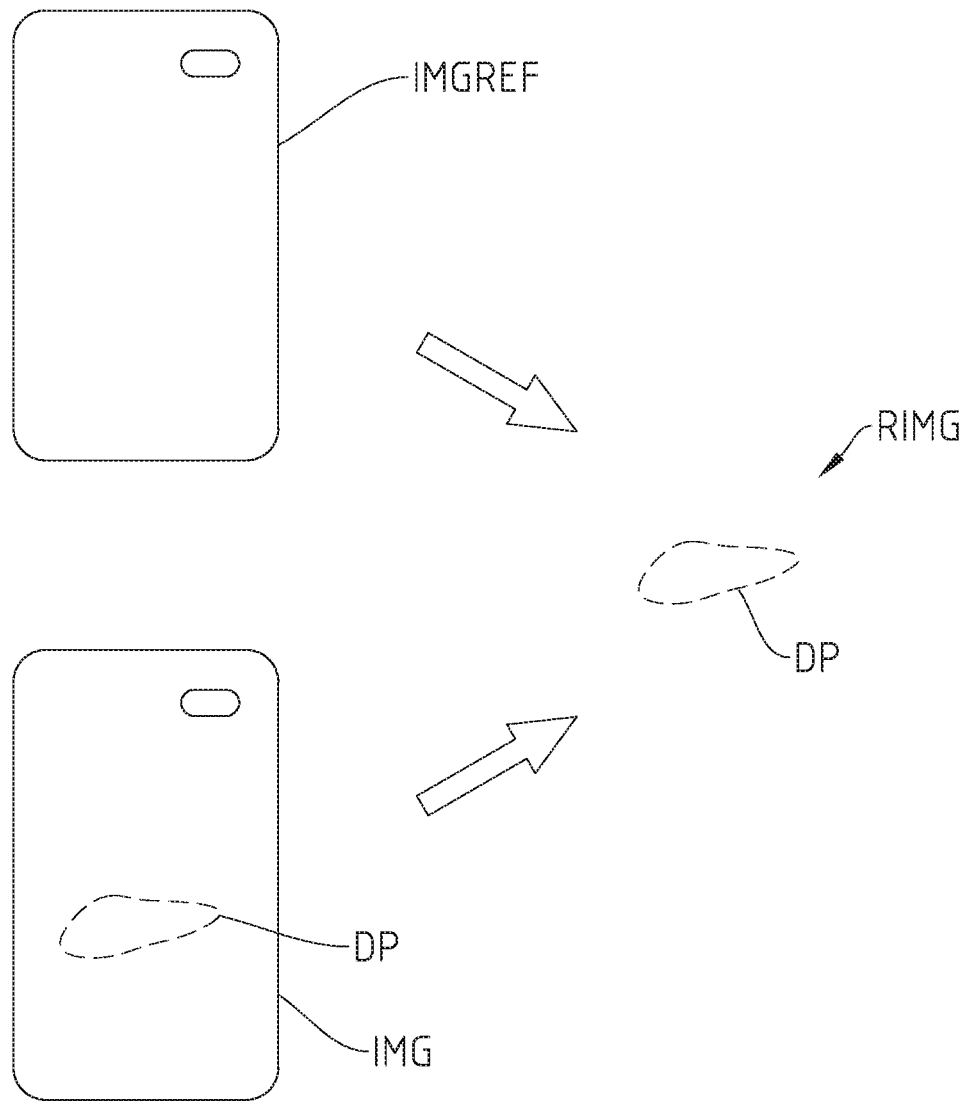
FIG. 8 is a schematic diagram show the comparison of a 3D ultrasonic image of a tested object and a 3D image of an accepted object according to an embodiment of the present disclosure.

Refer to FIG. 8. FIG. 8 is a schematic diagram show the comparison of a 3D ultrasonic image of a tested object and a 3D image of an accepted object according to an embodiment of the present disclosure. As mentioned above, the 3D ultrasonic image can be performed with the modeling process, such that the 3D ultrasonic image IMG having the shape similar to the actual shape of the tested object is obtained. Additionally, the 3D image is also performed with the modeling process, such that the 3D image IMGREF having the shape similar to the actual shape of the accepted object is obtained. FIG. 8 shows a simple comparison manner, the 3D ultrasonic image IMG and the 3D image IMGREF are directly compared with each other to output a difference image RIMG, wherein the difference image RIMG has the surface defect pattern DP, and thus that the surfaces of the tested object have the defect is determined. The modeling processed 3D ultrasonic image IMG and the modeling processed 3D image IMGREF, and the difference image RIMG can be output to the display via the output interface unit, so as to provide intuitive visual information to related users.

In short, the 3D detection device and the surface detection method provided by the present disclosure utilize the ultrasonic measuring, and the 3D detection device is configured to have a detection supporter base. Without the light source, the reflected ultrasonic signals are easily received by the ultrasonic transceiver module, the quality of the detection signals is better, and thus it results a precise detection result, and decreases a detection time much. Further, the present disclosure is suitable for the requirement of the application of the automatically continuous processing process, and it provides a reliable and positive means for preventing the defective objects from being continuously generated, and for monitoring an availability of the production line apparatus. Moreover, without modifying, the 3D detection device can be directly installed in the current production line apparatus as well as additional grabbing devices, and thus the present disclosure has many industrial benefits.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

The invention claimed is:

1. A three dimensional (3D) detection device, at least comprising:
   a detection supporter base, disposed on a transmission device of a production line apparatus;
   ultrasonic transceiver modules, disposed on at least one inner base surface of the detection supporter base, for emitting ultrasonic signals to surfaces of a tested object which enters the detection supporter base, receiving the reflected ultrasonic signals from the surfaces of the tested object, and generating detection signals according to the reflected ultrasonic signals; and
   a controller, communicatively connected to the ultrasonic transceiver modules, for receiving the detection signals, generating a 3D ultrasonic image according to the detection signals, and comparing the 3D ultrasonic image with a pre-established 3D image, so as to determine whether the surfaces of the tested object have at least one size or appearance defect.

2. The 3D detection device of claim 1, wherein a shape of the detection supporter base is a curved, T-shaped or semi-circular.

3. The 3D detection device of claim 1, wherein the ultrasonic transceiver module comprises an ultrasonic transmitting unit and an ultrasonic receiving unit.

4. The 3D detection device of claim 2, wherein the ultrasonic transmitting unit and the ultrasonic receiving unit are integrated in a single one module.

5. The 3D detection device of claim 1, wherein the 3D ultrasonic image and the 3D image are a modeling processed 3D ultrasonic image and a modeling processed 3D image, and the modeling processed 3D ultrasonic image and the modeling processed 3D image are compared with each other to generate a difference image.

6. The 3D detection device of claim 1, further comprising:
   cameras, disposed on the at least one inner base surface of the detection supporter base, for acquiring an optical image of the surfaces of the tested object, and the controller compares the optical image and a pre-established optical reference image, so as to determine whether the surfaces of the tested object have the at least one size or appearance defect.

7. The 3D detection device of claim 1, wherein the 3D ultrasonic image and the 3D image are compared with each other in at least one of a time domain, a frequency domain or a spatial domain.

8. The 3D detection device of claim 1, wherein to compare the 3D ultrasonic image with the 3D image, at least one eigenvalue or characteristic vector in one of a time domain, a frequency domain or a spatial domain of the 3D ultrasonic image is compared with that of the 3D image.

9. The 3D detection device of claim 1, wherein to compare the 3D ultrasonic image with the 3D image, a trained convolution neuron network is used to determine whether the surfaces of the tested object corresponding to the 3D ultrasonic image have the at least one size or appearance defect.

10. A surface detection method, comprising:
    providing the 3D detection device of claim 1;
    performing an ultrasonic measuring process on the tested object in the detection supporter base, so as to obtain the 3D ultrasonic image;
    obtaining the 3D image of an accepted object;
    comparing the 3D ultrasonic image with the 3D image; and
    outputting a detection result.

11. A production line apparatus, comprising:
    the 3D detection device of claim 1; and
    the transmission device, having a transmission belt and a motor, wherein the motor drives the transmission belt to transmit the tested object on the transmission belt.

12. The production line apparatus of claim 11, further comprising:
    grabbing devices, wherein one of them is used to grab the tested object in a pickup region to the transmission belt, and another one of them is used to grab the tested object which has passed the detection supporter base to an accepted object region or a defective object region according to a detection result.

* * * * *